Dec. 7, 1937.　　　　L. E. WELLS　　　　2,101,206
PROCESS OF MAKING RIBBED SEPARATORS
Filed March 19, 1935　　3 Sheets-Sheet 1

INVENTOR.
Leland E. Wells.
BY
ATTORNEYS

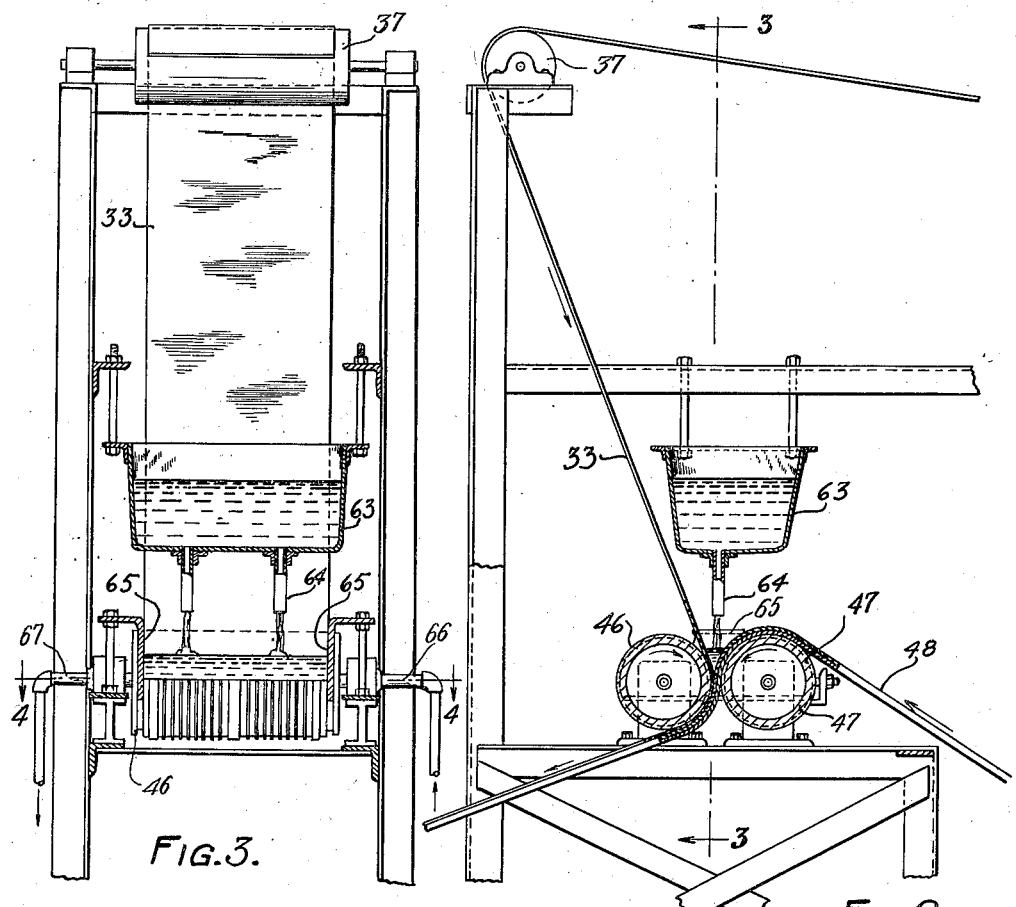
FIG. 3.
FIG. 2.
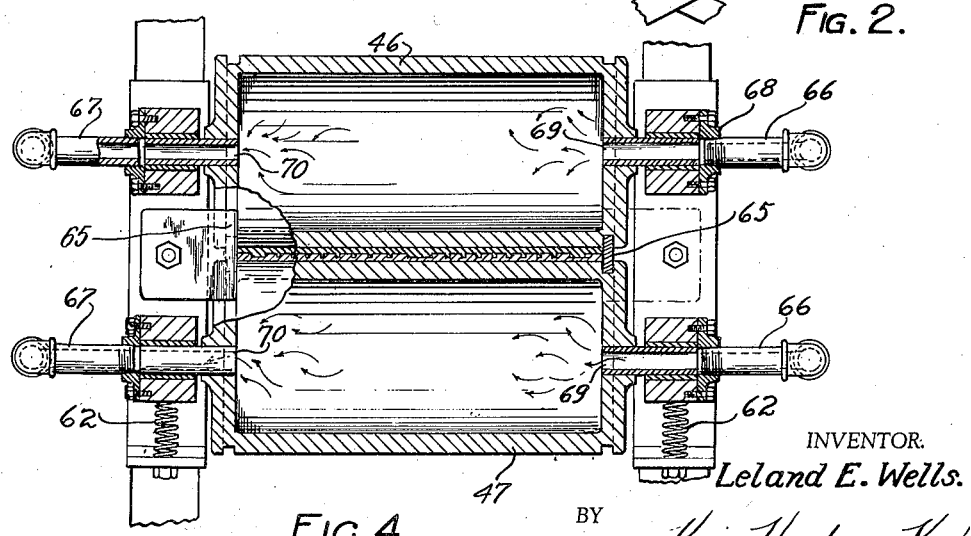
FIG. 4.
INVENTOR.
Leland E. Wells.
BY
ATTORNEYS.

Patented Dec. 7, 1937

2,101,206

UNITED STATES PATENT OFFICE 2,101,206

PROCESS OF MAKING RIBBED SEPARATORS

Leland E. Wells, Cleveland Heights, Ohio, assignor to Willard Storage Battery Company, Cleveland, Ohio, a corporation of West Virginia Application March 19, 1935, Serial No. 11,842

10 Claims. (Cl. 18—48)

This invention relates to a process of making ribbed separators for electric storage batteries, and has for its chief object to provide a process by which integral ribs are formed on the separators and to form the ribs in a manner such that the ribbing process and, in fact, the process of forming the separators as a whole, can be carried out inexpensively while, at the same time, separators are formed which are very satisfactory from the standpoints of strength, life, and performance in a battery.

More particularly it is an object of the invention to form the ribs by a continuous process on a strip or sheet which at the proper stage in the process of making the separators is acted on by the ribbing mechanism to form integral ribs extending longitudinally of the strip and spaced at proper intervals transversely thereof and which, after subsequent treatment, is cut into sections of the proper size to form storage battery separators.

A still further object is to provide a method or process of ribbing such that ribs of uniform dimensions and spacing and of uniform porosity are formed on the body of the separator, thereby producing separators which have a more uniform electrical resistance than would otherwise be the case.

While I do not regard my invention in its broad aspects as limited to any particular strip or sheet of separator-forming material, my invention is particularly effective when employed in connection with the materials and certain phases of the process described and claimed in an application filed in the name of Willard L. Reinhardt and myself, Serial No. 698,860, filed November 20, 1933, for Method of making microporous diaphragms (now Patent No. 2,052,490).

In the application referred to, there is described a diaphragm or separator permeated by pores of microscopic size of the character more fully described in Letters Patent of the United States No. 1,745,657 and No. 1,831,406 granted to Hermann Beckmann. The separator of application Serial No. 698,860, while having the microporous characteristics of the Beckmann products, consists of a sheet of porous material, preferably open weave cotton fabric, coated on both sides with microporous rubber and having its interstices filled with the same material, the rubber on both sides of the fabric and through the fabric being continuous, resulting in a separator having ample strength, high porosity, and other desirable characteristics of a satisfactory separator. In said application Serial No. 698,860, the microporous rubber which coats and fills the interstices of the inner fabric sheet is formed from latex or other dispersed rubber solution compounded with vulcanizing agents, accelerators, etc., and for convenience hereinafter referred to as "rubber solution." The sheet is first passed through and wetted by a gelling solution and then through the rubber solution so as to form a gel on both sides and in the interstices of the fabric sheet, the gel being a reticulous body with inter-aggregate pores of microscopically visible size occupied by the occluded water and serums. Subsequently the rubber gel sheet is vulcanized while the liquid remains interstitially included in the gel, thereby fixing the rubber in reticulous microporous structure.

At a suitable stage of the process, ribs are formed on or applied either to the sheet or to the finished separator, and, as disclosed in said application, rib-forming material in the form of strips or strands is laid on the gel-coated fabric when it is passing through the machine, after which the fabric is wound onto a drum which is conveyed to a vulcanizer and the vulcanizing is accomplished with the material maintained in a wet condition so as to keep the liquid of the gel in the pores until the curing is completed. After this operation the sheet is cut into sections of the proper size for use as separators or insulators in storage batteries.

In another application, Serial No. 735,719, filed July 17, 1934, in my name, there is disclosed and claimed a second method of ribbing the gel-coated sheet described above. Instead of forming ribs by causing previously formed strips or strands to be laid on and to adhere to and to be subsequently vulcanized to the gel-fabric sheet, the sheet, in accordance with the invention of the second mentioned application, is acted upon by suitable instrumentalities while passing through the machine to form folds or pleats which produce integral ribs on the finished separator. The folds thus formed in the gel-covered sheet may be allowed to stand out at right angles to the surface of the sheet or may be folded over in contact therewith, depending upon the character or the shape of the ribs that may be desired, but, in any event, the folded or creased portions adhere together, and, during the subsequent vulcanizing operation, become vulcanized to each other or both to each other and to the surface of the sheet if the creased portions are folded over against the latter.

In accordance with the present invention, the ribs are formed in still another way by molding them onto the strip in a novel and effective manner. When the process is applied to the gel-coated strip, as in the preferred embodiment, the ribs are formed from a material and in a manner such that, when molded on the strip, they become or are converted into a gel having the same reticulous structure as the gel on the strip and become integrally united therewith so that during the subsequent vulcanization these ribs have the same or substantially the same microporous structural characteristics as the body of the separator.

The invention may be further briefly summarized as consisting in certain novel steps and combinations of steps of the improved process which will be described in the specification and defined in the appended claims.

In the accompanying sheets of drawings wherein I have shown apparatus which may be used in carrying out the process in its preferred form, Fig. 1 is a side elevation of the equipment which may be used in carrying out the process;

Fig. 2 is an enlarged fragmentary side elevation with parts in section showing the rib-forming or molding part of the process;

Fig. 3 is a transverse sectional view substantially along the line 3—3 of Fig. 2;

Fig. 4 is a horizontal sectional view substantially along the line 4—4 of Fig. 3;

Figure 1:
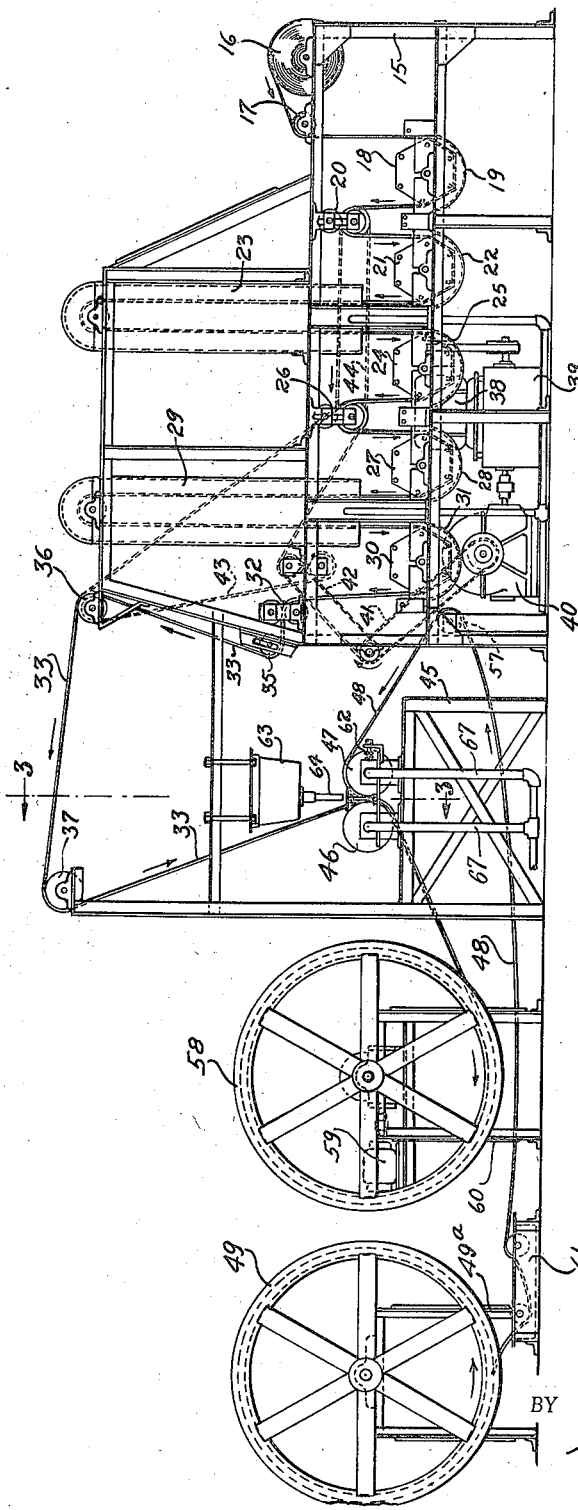

Referring now to the drawings, 15 represents a suitable framework for a portion of the apparatus used in carrying out the process of making separators with integral ribs in accordance with the present invention. The porous material which is treated and operated on in passing through the machine is fed from a roll 16 supported at the righthand end of the frame 15, as the same is viewed in Fig. 1. This material is porous, and, while it is preferably in the form of a woven cotton fabric with an open weave, it is not necessarily in the form of woven fabric. However, for convenience it will be referred to as fabric. As the fabric is fed from the roll 16, it passes over a guide roller 17 and then down about the periphery of a rotatable drum 18 extending down into a trough 19 containing a suitable gelling solution, such as magnesium sulphate. This drum, like others about which the strip passes, has an open periphery in the sense that it is formed by a number of spaced horizontally disposed bars or rods which the strip engages in passing around the drum. The solution in the trough 19 and in similar troughs associated with other drums about which the strip passes is on the interior as well as on the exterior of the drum so that the solutions or liquids have access to both sides of the strip. As it passes through this bath, the fabric becomes saturated with the gelling solution and it passes upwardly between a pair of squeeze rolls 20 and then around a second drum 21 which extends down into a trough 22 containing the rubber solution which, as previously stated, is latex or other dispersed rubber solution which has been suitably prepared so as to have a known solid content and compounded with the desired ingredients, such as sulphur, and possibly others, such as accelerators. As the rubber solution comes in contact with the strip saturated with the gelling solution, the rubber solution immediately coagulates on both sides and in the interstices of the fabric and is then in the condition fully described in the Beckmann patents and in application Serial No. 698,860, the action of the gelling solution on the rubber solution being to form a gel or reticulous body with inter-aggregate pores of microscopically visible size occupied by the liquid of the rubber solution. Next the strip is passed through a steam chamber 23 which immediately sets the gel thus formed, the fabric extending up through the bottom of the chamber around a roller at the top thereof and then down and out from the lower end of the chamber. The fabric may be passed any desired number of times through similar baths and steam chambers, depending upon the thickness of the microporous rubber film desired on each side of the fabric. In this instance it is given a second series of treatments similar to those just described. The fabric, after it emerges from the lower end of the steam chamber 23, extends down around a drum 24 extending into a trough 25 containing a gelling solution, such as magnesium sulphate, and then again upwardly between a pair of squeeze rolls 26 and then downwardly around a drum 27 in a trough 28 containing the rubber solution, then through a steam chamber 29 to again set the gel thus formed, this chamber being similar to the chamber 23, and then down around another drum 30 which dips down into a trough 31 containing water. After passing around the drum 30, the strip, now coated and filled with gel which is permeated with the microscopically visible pores filled with the liquid of the rubber solution, passes upwardly between a pair of rolls 32 and then to the rib-forming part of the equipment.

After passing through the squeeze rolls, the gel-fabric strip is ready for the application of the rib-forming gel. The strip, which is designated 33, after leaving the squeeze rolls 32, passes around a floating roll 35 and then upwardly around an upper roll 36, then around a second upper roll 37, and then downwardly to the rib-forming part of the equipment which will be referred to presently. None of the rolls about which the gel-fabric strip passes, including the squeeze rolls, close the network of microscopic liquid-filled pores of the gel.

The strip is drawn off the roll 16 and is caused to pass around the various drums 18, 21, 24, 27, and 30, and about the various rolls referred to, including the roll 36, by driving certain of these rolls. While the details of the drive are quite immaterial to the invention, in this instance power is obtained from a motor 38, and from here the drive is through reducing gears in a gear box 39 and then through further reducing gears in a gear box 40. The gear box 40 has a driven pulley, and from this pulley power is taken by belts 41, 42, 43, and 44 so as to drive the lower squeeze roll 20, the lower squeeze roll 26, and the upper roll 36. These driving belts are indicated by dotted lines so as to avoid confusion with the strip which is drawn from the roll 16 and passes through the gel-forming and applying part of the equipment and emerges therefrom as the gel-fabric strip 33. The driving of these rolls is sufficient to cause the strip to be moved through that part of the equipment already described, the strip being drawn through the remaining part of the equipment by a positively driven drum the drive of which is coordinated with the driving mechanism already referred to.

Figure 5:
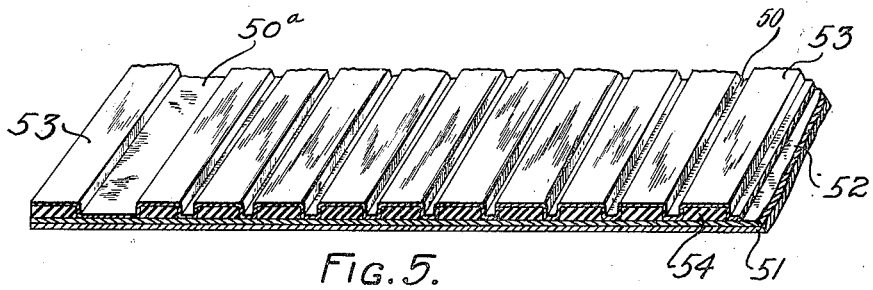
Fig. 5 is a sectional perspective view of a portion of the liner on an enlarged scale.

Considering now the rib-forming part of the process more directly involving the present invention, i. e., the process or that part of the process wherein there are produced on the gel-fabric strip 33 ribs of gel of predetermined spacing and shape formed by a molding process, it will be observed that adjacent that end of the frame 15 from which the gel-fabric strip 33 passes is a frame 45 on which are mounted side by side two smooth-surfaced rotatable drums 46 and 47 the adjacent portions of the peripheries of which are maintained far enough apart so that there may pass between them the gel-fabric strip 33 and a flexible strip 48 constituting a combined liner and mold which is unwound from a drum 49 rotatably supported on a frame 49ª, see the lefthand side of Fig. 1. This liner is smooth on one side and on the other is provided with grooves the width, depth, and spacing of which correspond to the proportions and spacing of the ribs which are to be produced on the finished separator, the grooves extending in parallel relation lengthwise of the liner since the ribs are to be formed in parallel relation and lengthwise of the gel-fabric strip which is later converted by vulcanization into a microporous rubber strip or sheet. The liner is preferably constructed as shown in Fig. 5. In this figure, 50 represents grooves having the shape and spacing of the regular ribs of the separator, and there may be two or more wider grooves 50ª from which the somewhat wider outermost ribs of the separator may be formed. The liner, like the gel-fabric strip 33, is of indeterminate length, and its width corresponds substantially to the width of the strip 33. This dimension of the liner and of the strip being formed and treated may be anything desired from the width of a separator (with provision for trim on both sides) to any desired or convenient multiple of the separator width. The width indicated in the drawings, and particularly in Fig. 4, is slightly in excess of twice the width of a separator which it will be understood may have any dimensions required by a particular battery and may have ribs of any desired number, spacing, and cross-sectional dimensions.

The liner illustrated in Fig. 5 is composed of two bottom strips 51 and 52 of fabric, the lower strip 51 being preferably rubber-frictioned on its inner side and the upper strip being preferably rubber-frictioned on both sides. The opposite or working face of the liner is composed of a fabric strip 53 rubber-frictioned on its under side, this strip being corrugated to form the ribbing grooves 50 and 50ª. Between the strips 53 and 52 is a cushion of heat-resisting soft rubber 54 which lies especially beneath the upper fabric between the rib-forming grooves 50 and 50ª, although, if desired, it may extend continuously beneath as well as between these grooves.

Figure 6:
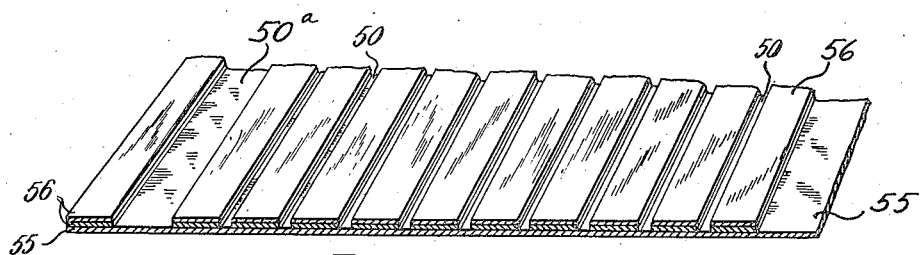
Fig. 6 is a similar view showing a modified form of liner.

If desired, the liner may be constructed as in my application Serial No. 735,719, the same being illustrated in Fig. 6, wherein the liner is shown as formed of a backing strip 55 of fabric rubber-frictioned on its upper face and of superposed strips 56 spaced apart to form the grooves 50 and 50ª and of sufficient height and therefore number to form ribs of the desired height on the finished separator. The outer or upper most strips 56 are rubber-frictioned on their lower sides only, while the intermediate strip or strips are preferably rubber-frictioned on both sides.

The liner 48 is led from the lower part of the drum 49 laterally toward the frame 15 beneath the drums 46 and 47 to and around a roll 57 supported on the lower lefthand side of the frame 15 as the same is viewed in Fig. 1. Then the liner passes upwardly and around the top of the drum 47 and then downwardly between the adjacent peripheries of the drums. At the same time, the gel-fabric strip 33 is led from the pulley 37 downwardly between the drums 46 and 47 where it contacts with the liner 48 and then the two strips 33 and 48 pass in contacting relation from the lower part of drum 46 to and around a drum 58 driven by a motor 59, the drum and the driving motor and suitable reduction gearing being supported on a frame 60. The winding of the composite strip onto the positively rotated drum 58 causes the liner to unwind from the drum 49 and the rate of rotation of the drum 58 is so timed or coordinated with respect to the previously described driving mechanism for the gel-fabric strip 33 that the strip 33, as it passes beyond the upper roll 36, is kept taut and moves continuously from the strip-treating or coating part of the equipment through the rib-forming equipment and onto the drum 58, the floating roll 35 moving up and down and therefore compensating for any slight temporary non-conformity of the two drives.

As the liner 48 leaves the drum 49, it passes through a bath of gelling solution, such as magnesium sulphate, held in a suitable container 61 located in this instance on the floor beneath the drum 49 from which the liner is unwound, so that it or the upper and lower fabric strips of the liner become saturated with the gelling solution and remain so while passing between the drums 46 and 47 in contact with the gel-fabric strip 33. It will be understood, of course, that, as the liner 48 passes around the drum 47, the rib-forming grooves of the liner are upward, and it is the grooved face of the liner which contacts with the gel-fabric strip 33 between the drums 46 and 47. It may be mentioned at this point that the drum 47 is pressed yieldingly toward the drum 46 by springs 62 which engage movable bearings of the drum 47 (see particularly Fig. 4) so that, as the liner and the gel-fabric strip pass between the drums, the latter exert a slight pressure on them to insure their engagement with each other in the narrow slit or space between the drums, and at the same time the drum 47, by reason of its yielding mounting, can come and go slightly, if circumstances require it, to compensate for irregularities in the thickness of the two contacting strips. However, the pressure of the drums on the strips is not sufficient to distort or to affect the reticulous structure of the gel on the strip 33. As the two strips pass down into the V-shaped gap between the upper portions of the two drums and come into contact with each other in the space between the drums, the grooves in the liner are filled with rib-forming material, preferably rubber solution, substantially the same as that employed in the troughs 22 and 28 through which the fabric strip is passed. For this purpose, I support above the drums (see Figs. 1, 2, and 3) a suitable container 63 to which a quantity of the rubber solution is supplied, and at the bottom of this container I provide one or more delivery spouts or outlets 64 arranged so as to discharge the rib-forming material directly between the gel-fabric strip 33 and the liner 48 in the V-shaped space above the line at which the two strips contact. I prefer to insert between the two drums at opposite ends V-shaped closure members 65 so that the two converging strips 33 and 48 which enter the space above the drums and these closure members constitute in effect a closed chamber which holds a quantity of the rib-forming material delivered from the container 63, as best shown in Figs. 2 and 3.

For the rib-forming material or rubber solution which is supplied to the container 63, I prefer to employ a latex compound, i. e., latex with the vulcanizing and other ingredients usually added for this purpose, which compound is preferably thickened somewhat by a suitable thickening agent, such as karaya gum. I find that approximately 3 grams of the gum to about 1500 cubic centimeters of the latex compound is ample for this purpose.

This rubber solution fills the grooves of the liner just before the liner engages the gel-fabric strip, and as the liner is impregnated with the gelling solution, the rubber solution is converted to gel of the same reticulous form as the gel of the strip 33, and these gel ribs become amalgamated with the gel on the adjacent face of the gel-fabric strip 33. The drums 46 and 47 are preferably heated so as to cause the gel which fills the grooves of the liner to immediately set. For this purpose, steam may be passed through the drums, and in Fig. 4 steam inlet pipes 66 are shown extending into the ends of the drums at one side of the apparatus, and steam outlet pipes 67 extend from the opposite ends. These pipes 66 and 67 are in this instance screwed into flanges 68 on the drum bearings and hollow inlet pipes 69 and hollow outlet pipes 70 constitute the journals of the drum.

Figure 7:
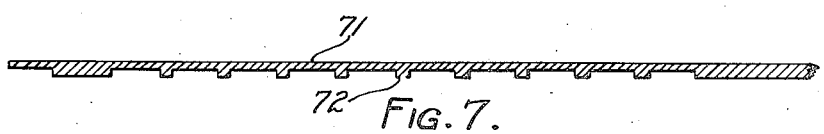
Fig. 7 is a transverse sectional view through the ribbed strip which is produced by the mechanism of Fig. 1.

As stated above, the gel filling the rib-forming grooves of the liner becomes amalgamated with the gel on the adjacent face of the gel-fabric strip 33 and remains so before and during the vulcanizing operation when the gel is converted to stiff but flexible hard microporous rubber, with the ribs not only integral with the body of the sheet but uniform therewith as though the ribs and the adjacent layer of rubber were initially formed from the same body of gel. After passing from between the drums 46 and 47, the composite strip, i. e., the gel-fabric strip and the liner, now containing the molded gel ribs is wound onto the drum 58. After the drum is filled, the drum 58 is removed from the bearings in the supporting frame 60 and is placed in a vulcanizer where the vulcanization is completed under conditions fully described in the Beckmann patents and in the Reinhardt and Wells application Serial No. 698,860, i. e., the gelled mass is vulcanized to hard rubber without the escape of the retained liquid, thereby fixing the rubber in reticulous microporous structure. After vulcanization, the liner, with the vulcanized rubber strip, is unwound from the drum, and the liner is removed from the ribbed rubber strip and is wound onto a drum, such as the drum 49, and then may be used again in the manner already explained. In Fig. 7 I have shown a portion of the ribbed microporous sheet, the body of the sheet being designated 71 and the ribs which extend in spaced relation longitudinally of the strip or sheet being designated 72. I might add that a suitable powder may be introduced into the magnesium sulphate with which the liner is impregnated when it passes through the container 61 so as to facilitate the stripping of the liner from the vulcanized rubber-fabric strip. For this purpose, I may add to the magnesium sulphate or other gelling solution a small amount of bentonite.

Figure 8:
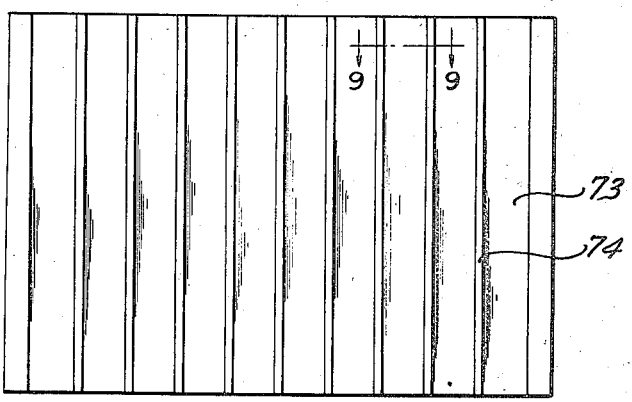
Fig. 8 is a face view of one of the finished separators which is cut from the strip of Fig. 7.
Figure 9:
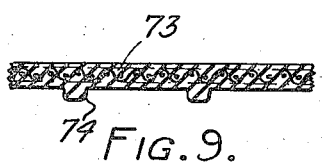
Fig. 9 is an enlarged cross-sectional view substantially along the line 9—9 of Fig. 8.

The strip is then cut into separators of the desired size, one of which is shown at 73 in Fig. 8, the separator having parallel ribs 74, shown in Fig. 8 and also in the enlarged sectional view of Fig. 9. It was already pointed out that any desired thickness of gel layers may be formed on the fabric strip, this being determined, of course, by the desired thickness of the finished separators. While the thickness will vary with the particular type of battery in which the separators are used, I have found that very good results are obtained for batteries intended for certain uses if the rubber layer on each side of the fabric strip is quite thin, in fact of less thickness than the fabric itself, resulting in a separator having extremely low resistance.

The ribs which are thus formed on the separator are, as before stated, integral with the rubber which coats both sides and extends through the fabric, and it is to be noted that these ribs are microporous the same as the remainder of the rubber of the separator, and, by reason of this characteristic, the ribs add little, if anything, to the resistance of the separator, the resistance being obviously less than that of similar separators provided with non-porous ribs. Thus it will be seen that by forming the gel-fabric strip and molding ribs thereon from material which becomes gelled so as to be similar in character to the gel of the strip and becomes amalgamated therewith so that by vulcanization the gel becomes converted to hard rubber with the ribs integral with the body of the ribbed strip or separator and the whole having the minute, closely arranged pores which provide the necessary low internal resistance when used in a battery, and since the process can be carried on substantially continuously, the objects of the invention to provide a good microporous separator at low cost are attained. The process may be carried out by other equipment and instrumentalities than those herein illustrated, and the process itself may be varied considerably without departing from the spirit and scope of the invention. For example, the invention in its broad aspects is not limited to the particular manner herein described in which the gel is formed and applied to the fabric strip, nor is it necessarily confined to the application of a layer of gel on both sides of the strip nor to a process wherein the strip, if used, forms a permanent part of the microporous rubber sheet and therefore of the finished separator.

If it is desired that the separators be formed of microporous rubber alone, the gel may be formed in a uniform layer of the desired thickness on a suitable stationary or movable base, and after the gel has been set by the application of heat, the rib-forming gel may be added to form the ribs substantially as herein described. For example, the base may be flexible and movable, such as a strip of tough, closely woven fabric, and the gel may be poured thereon so as to form a layer of predetermined thickness. It can then be moved over a heated table to cause the gel to set, and then the fabric base with the gel thereon and a liner such as herein described may be passed between two rolls, such as the rolls 46 and 47, and the ribs formed thereon in the manner previously described. After vulcanization, both the liner and the fabric base may be stripped from the vulcanized, ribbed, microporous rubber strip.

I therefore aim in my claims to cover all modifications which do not involve a departure from the invention in its broadest aspects.

Having thus described my invention, I claim:

1. The process of making ribbed microporous separators which comprises forming a strip of reticulous rubber gel, and molding ribs thereon from additional reticulous rubber gel and amalgamating the same with the rubber gel strip.

2. The process of making microporous separators which comprises forming a strip of reticulous rubber gel with interstitially included liquid, molding ribs on the strip from additional similar rubber gel and amalgamating the same with the strip, and subsequently curing the ribbed gel strip and in so doing preventing the escape of the interstitially included liquid of the gel.

3. The process of making microporous ribbed separators which comprises forming a sheet of reticulous rubber gel from a rubber solution and thereafter forming spaced ribs on the sheet from additional but similar gel and amalgamating the same with the sheet.

4. The process of making microporous ribbed separators which comprises forming a strip of reticulous rubber gel with interstitially included liquid, and thereafter forming spaced ribs on the strip from additional reticulous rubber gel and amalgamating the same with the gel strip, and curing the ribbed gel strip while the liquid remains interstitially included in the gel thereby fixing the rubber in microporous structure.

5. The process of making a microporous rubber sheet which comprises applying to a fabric strip a layer of rubber gel having liquid filled pores of microscopically visible size, applying to said rubber gel layer ribs of the gel by molding the same thereon from additional rubber gel, and thereafter curing the sheet while the liquid remains in the gel.

6. The process of making a ribbed microporous sheet which comprises applying to a fabric strip while the same is in motion a layer of rubber gel with pores of microscopically visible size occupied by liquid, molding onto said layer of gel ribs from additional rubber gel, and subsequently curing the ribbed gel while the liquid remains therein thereby fixing the rubber in reticulous microporous structure.

7. The process of making a ribbed microporous rubber sheet from which storage battery separators may be cut which comprises applying to each side of a fabric sheet a layer of rubber gel having liquid filled pores of microscopically visible size, molding thereon ribs from additional rubber gel, and subsequently curing the ribbed sheet while the liquid remains in the gel.

8. The process of making a microporous sheet having integral microporous ribs which comprises applying a grooved strip to a sheet of reticulous rubber gel having liquid filled pores of microscopically visible size, filling the grooves of the strip with additional rubber gel and molding ribs in the grooves of the strip and on the face of the gel sheet, and thereafter curing the ribbed sheet without permitting the escape of the liquid of the gel.

9. The process of making a ribbed microporous rubber sheet from which separators may be cut comprising passing a fabric strip through a gelling solution and then through a rubber solution whereby a layer of reticulous gel is formed on the strip, molding ribs on the gel layer from similar gel, and subsequently vulcanizing the ribbed gel sheet so as to fix the rubber in reticulous microporous structure.

10. The process of making a ribbed microporous rubber sheet from which separators may be cut comprising forming a reticulous rubber gel on and in the interstices of a fabric strip, molding ribs from similar gel on the gel of the strip, and subsequently vulcanizing the ribbed sheet so as to fix the rubber in reticulous microporous structure.

LELAND E. WELLS.